(12) United States Patent
Tsai

(10) Patent No.: US 6,868,753 B2
(45) Date of Patent: Mar. 22, 2005

(54) COMPOSITE ROTORS FOR FLYWHEELS AND METHODS OF FABRICATION THEREOF

(75) Inventor: Stephen W. Tsai, Palo Alto, CA (US)

(73) Assignee: The Board of Trustees of the Leland Stanford Junior Univesity, Stanford, CA (US)

( * ) Notice: Subject to any disclaimer, the term of this patent is extended or adjusted under 35 U.S.C. 154(b) by 0 days.

(21) Appl. No.: 09/894,856

(22) Filed: Jun. 27, 2001

(65) Prior Publication Data

US 2003/0000336 A1 Jan. 2, 2003

Related U.S. Application Data

(60) Provisional application No. 60/214,329, filed on Jun. 27, 2000.

(51) Int. Cl.[7] ................................................ F16F 15/10
(52) U.S. Cl. ......................................................... 74/572
(58) Field of Search ........................................... 74/572

(56) References Cited

U.S. PATENT DOCUMENTS

| | | | | |
|---|---|---|---|---|
| 3,859,868 A | * | 1/1975 | Post ............................. | 74/572 |
| 4,198,878 A | * | 4/1980 | Lewis et al. .................. | 74/572 |
| 4,320,160 A | * | 3/1982 | Nishimura et al. .......... | 428/107 |
| 4,370,899 A | | 2/1983 | Swartout ...................... | 74/572 |
| 4,817,453 A | * | 4/1989 | Breslich et al. .............. | 74/572 |
| 4,966,527 A | * | 10/1990 | Merz ............................ | 416/241 R |
| 5,057,071 A | * | 10/1991 | Piramoon ..................... | 494/16 |
| 5,079,196 A | * | 1/1992 | Arfsten et al. ............... | 501/95.2 |
| 5,134,003 A | * | 7/1992 | Hackenberg ................. | 428/36.3 |
| 5,285,699 A | * | 2/1994 | Walls et al. ................... | 74/572 |
| 5,476,685 A | * | 12/1995 | Rocher et al. ............... | 427/249.2 |
| 5,695,584 A | * | 12/1997 | Gregoire ...................... | 156/169 |
| 5,739,268 A | * | 4/1998 | Van Ast ....................... | 528/492 |
| 5,756,208 A | * | 5/1998 | Haug et al. .................. | 428/379 |
| 5,811,900 A | * | 9/1998 | Serdar et al. ................. | 310/74 |
| 5,913,337 A | * | 6/1999 | Williams et al. ............. | 138/125 |
| 5,921,754 A | * | 7/1999 | Freitas et al. ................ | 416/230 |
| 6,029,350 A | * | 2/2000 | Maass et al. ................. | 29/894 |
| 6,138,527 A | * | 10/2000 | Bitterly et al. ................ | 74/572 |

OTHER PUBLICATIONS

Toray Timeline, www.torayca.com.*
"The Open Core Composite Flywheel"—Kirk, James A., 1997 Intersociety Energy Conversion Engineering Conference.*
"Batteries for the 21st Century: Composite Flywheels"—Bakis, Charles E., 1998.*

* cited by examiner

Primary Examiner—Thomas R. Hannon
Assistant Examiner—Julie K. Smith
(74) Attorney, Agent, or Firm—Lumen Intellectual Property Services, Inc.

(57) ABSTRACT

A flywheel for use as an energy storage device is made of hoops of different fiber composite layers, the radial thickness of each hoop and the physical properties of the fiber composite in each loop being chosen by a computer modeling optimization procedure to maximize total energy of storage while minimizing radial stress.

11 Claims, 15 Drawing Sheets

Master curves of unidirectional CFRP under strand test

| Material Property | A | B | C | Unit |
|---|---|---|---|---|
| $E_{\theta\theta}$ | 38.6 | 130 | 155 | GPa |
| $E_{zz} = E_{rr}$ | 8.27 | 9 | 9 | GPa |
| $G_{\theta z} = G_{\theta r}$ | 4.14 | 4.55 | 4.55 | GPa |
| $G_{rz}$ | 4.14 | 4.55 | 4.55 | GPa |
| $V_{\theta r} = V_{\theta z} = V_{rz}$ | 0.26 | 0.3 | 0.3 | |
| X | 1062 | 1800 | 2900 | MPa |
| X' | 610 | 1400 | 1600 | MPa |
| Y | 31 | 80 | 70 | MPa |
| Y' | 118 | 168 | 168 | MPa |
| S | 72 | 48 | 48 | MPa |
| $\alpha_x$ | 8.6 | -0.3 | -0.3 | $10^{-6}/°C$ |
| $\alpha_y$ | 22.1 | 28.1 | 28.1 | $10^{-6}/°C$ |
| $\rho$ | 1800 | 1600 | 1600 | Kg/m$^3$ |

Fig. 5

| | |
|---|---|
| Fiber diameter, $r_f$ | 7.5 $\mu$m |
| Kozeny constant, $k_\pi$ | 5.5 |
| Resin viscosity, $\mu$ | 0.1 Pa.s |
| Resin density, $\rho$ | 1,000 Kg / m³ |
| Angular velocities, $\omega$ | 10 rps, 20 rps, 30 rps, 40 rps, 50 rps |
| Inner radius of cylindrical preform, $r_i$ | 0.0762 m ( 3" ) |
| Quter radius of cylindrical preform, R | 0.305 m ( 12" ) |

Fig. 11

COMPOSITE ROTORS FOR FLYWHEELS AND METHODS OF FABRICATION THEREOF

CROSS-REFERENCE TO RELATED APPLICATIONS

This application is cross-referenced to and claims priority from U.S. Provisional application 60/214,329 filed on Jun. 27, 2000, which is hereby incorporated by reference.

STATEMENT REGARDING FEDERALLY SPONSORED RESEARCH OR DEVELOPMENT

This invention was supported in part by grant number F29601-01-C-0017 from the Air Force Research Labs (AFRL). The Government has certain rights in the invention.

FIELD OF THE INVENTION

This invention relates to the field of high-speed rotors and particularly relates to design and manufacture of rotors and flywheels using fiber composite materials.

BACKGROUND OF THE INVENTION

The flywheel has long been recognized as a potentially useful energy storage device for use in many different applications. Perhaps one of the most important potential applications is in vehicles such as buses and automobiles, where the flywheel can be used to manage the power to the drive wheels. Flywheel modified buses have been tested in urban public transport. However, flywheel energy storage devices have not come into general use in buses or in other transportation vehicles. Thus far flywheels have not met the required levels of performance, especially in the areas of total energy stored, total system weight, energy efficiency, rotor longevity, cost, and safety.

Thus there is a need to provide a flywheel energy storage system that has maximized energy storage capacity, minimized system weight, minimized containment weight, improved energy efficiency when used in transportation, improved rotor longevity, and improved safety performance.

OBJECTS AND ADVANTAGES

It is an object of the present invention to provide a flywheel rotor that is optimized to maximize energy storage and to minimize rotation induced radial strain in the rotor.

It is a further object of the present invention to provide a flywheel which, when it fails at high speed, does so in a controlled and safe manner.

It is a further object of the present invention to provide a flywheel that for a given amount of energy storage capacity requires less mass in the containment vessel than was required heretofore.

It is a further object of the present invention to extend the useful life of the rotor by optimizing the materials selected for use in the rotor and by optimizing the physical properties of those materials.

It is a further object of the present invention to improve the performance of flywheels by using fiber composite materials in the construction of the flywheels.

It is a further object of the invention to provide improved manufacturing processes for the manufacture of flywheels.

SUMMARY

The objects and advantages of the present invention are secured by providing a flywheel that includes a hybrid rotor. The hybrid rotor is an annular disc having an outer radius and an inner radius and consists of a number of concentric layers of different materials. Each of these layers (or hoops or plies) adjoins another layer in concentric fashion. The radial thickness of a layer may be different from the radial thickness of adjoining layers. The axial thickness of layers may also be different from layer to layer as required. The dimensions of each layer and the choice of material used in each layer are determined by an optimization procedure that maximizes total stored energy and minimizes rotation generated radial stress. Typical materials used in the layers may include various fiber composite materials such as glass/epoxy material, carbon fiber material, T300/2500™, T800H/2500™, T1000™, or any other suitable material. The percentage of fiber within the material of any layer may be adjusted in the optimization procedure to any appropriate value. In any layer the fiber composite material may be modified by addition of modifier materials that are intended to alter material properties of the layer such as density, rigidity, strength and so on. Such modifier materials may include metallic or ceramic powders added to the resin. To provide controlled rotor failure, one or more layers may be modified by the addition of such modifier materials.

The optimization procedure, as stated, maximizes total stored energy of rotation and also minimizes the radial stress of rotation. As part of this optimization procedure the stiffness of each layer is specified. Generally the outer layer or rim of the rotor will have the highest value of stiffness. The optimization procedure can include the optimization of other properties of the material in each layer, such as, hoop and radial strengths, thermal expansion coefficients, and mass density.

The invention also provides methods for manufacturing hybrid rotors. The manufacturing methods include cigarette rolling, wet filament winding and dry filament winding. The manufacturing methods further include a smart cure cycle, in which the cure cycle is controlled to anticipate and allow for exothermic reactions in the material being cured. The manufacturing methods further include centrifugal casting in which the rotor is infused with resin while the rotor is rotating, the resin being introduced into the rotor near the inner radius, so that centrifugal force causes the resin to flow towards the outer radius. The manufacturing methods further include centrifugal smart cure, in which the rotor is rotated during the smart cure. The manufacturing methods further include centrifugal casting combined with centrifugal smart cure.

BRIEF DESCRIPTION OF THE FIGURES

FIG. 1A shows the case of isotropy where k=1. FIG. 1B shows a case of modest orthotropy where k=2. FIG. 1C shows a case of high orthotropy where k=5.9.

FIG. 2A shows three radial distributions of hoop stiffness that were used in modeling, m=0 being constant, m=1 being linear, and m=2 being quadratic functions of the radius.

FIG. 2B shows hoop stress, $\sigma_\theta$ as a function of radial position within a rotor, for the three stiffness distributions shown in FIG. 2A.

FIG. 2C shows radial stress, $\sigma_r$ as a function of radial position within a rotor for the three stiffness distributions shown in FIG. 2A.

FIG. 5 is a table listing the properties of three fiber composite materials.

In FIG. 10A the temperature is plotted against time for three radius positions within the rotor of FIG. 8.

FIG. 11 is a table of material properties and processing conditions for calculating centrifugal casting (infusion) fill times.

DETAILED DESCRIPTION

A hybrid rotor is made of a number of concentric hoops or layers of fiber composite material. A new look at the selections of material, geometry and manufacturing processes for flywheels is proposed. A systems approach will rely heavily on analytic modeling of stress analysis, interactive failure criteria, optimization, curing, resin flow, progressive failure and long-service life prediction.

Variations in ply stiffness and density will be modeled to minimize radial stress in the rotor during high-speed rotation. The intent is to improve rotor performance without reducing the strength.

Stress distributions in flywheel rotors have been analyzed by Lekhnitskii at p. 151 in "Anisotropic Plates", editors Stephen W. Tsai and Ted Cheron, publisher Gordon and Breach, 1968.

$$\sigma_r = \frac{\gamma \omega^2 a^2}{g} \frac{3+v_\theta}{9-k^2} \left[ \left(\frac{r}{a}\right)^{k-1} - \left(\frac{r}{a}\right)^2 \right] \quad (1)$$

$$\sigma_\theta = \frac{\gamma \omega^2 a^2}{g} \frac{k}{9-k^2} \left[ (3+v_\theta)\left(\frac{r}{a}\right)^{k-1} - k(1+3v_r)\left(\frac{r}{a}\right)^2 \right] \quad (2)$$

$$\tau_{r\theta} = 0 \quad (3)$$

Figure 1A:
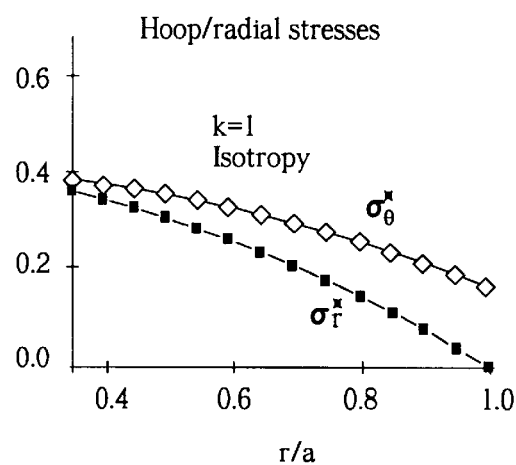
FIGS. 1A, 1B, and 1C show the effect of orthotropy on radial stress in a flywheel rotor. In these figures, k is the square root of the ratio of hoop over radial Young's modulus, i.e., $$\sqrt{\frac{E_\theta}{E_r}}.$$
Figure 1B:
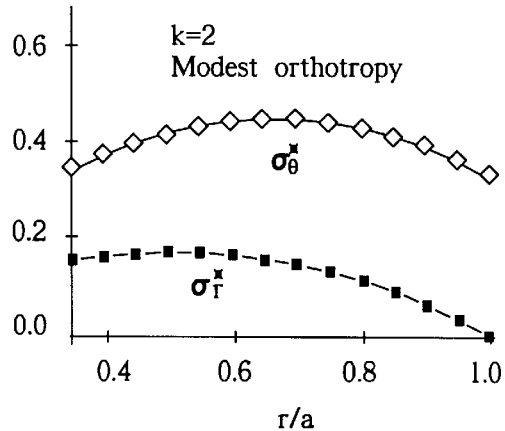
Figure 1C:
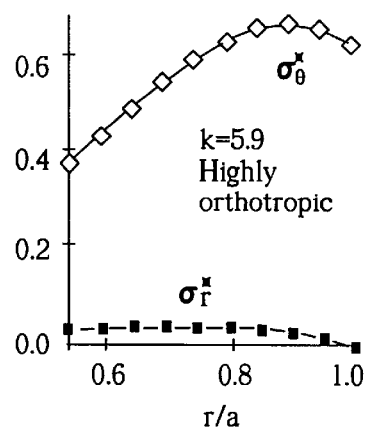

The effect of orthotropy on radial stress $\sigma_r$ and hoop stress $\sigma_\theta$, as calculated by using equations (1) and (2) respectively, is shown in FIGS. 1A, 1B, and 1C. In these figures, k is the square root of ($E_\theta \div E_r$). The radial stress $\sigma_r$ and the hoop stress $\sigma_\theta$ are plotted against the normalized radius r/a, where r is the radius and a is the outer radius. FIG. 1A, shows the case of isotropy, where k=1, where the radial and hoop stresses are nearly the same. FIG. 1B shows a case of modest orthotropy, were k=2, where the nature of stress distributions is changed and the radial stress $\sigma_r$ decreases significantly. This case corresponds to rotors with radial fibers. It is difficult to justify the use of radial fibers from a stress analysis viewpoint, not to mention manufacturing complexity. FIG. 1C shows a case of a highly orthotropic rotor, where k=5.9. In FIG. 1C the radial stress $\sigma_r$ is two orders of magnitude less than the hoop stress $\sigma_\theta$. The conclusion is that highly orthotropic materials should be used if radial stresses are to be kept vanishingly small. Two- and three-dimensional fiber architecture that has radial fibers gives higher stiffness and strength but also induce higher radial stresses. The net result is that radial fibers do not lead to higher stored energy and in fact cause premature failures like micro cracking and delamination.

Figure 2A:
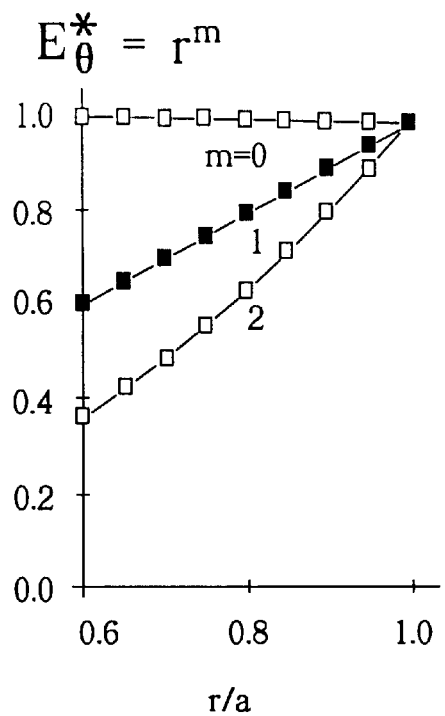
FIGS. 2A, 2B, and 2C show the results of modeling the effects of hoop stiffness radial distribution on radial stress and on hoop stress.
Figure 2B:
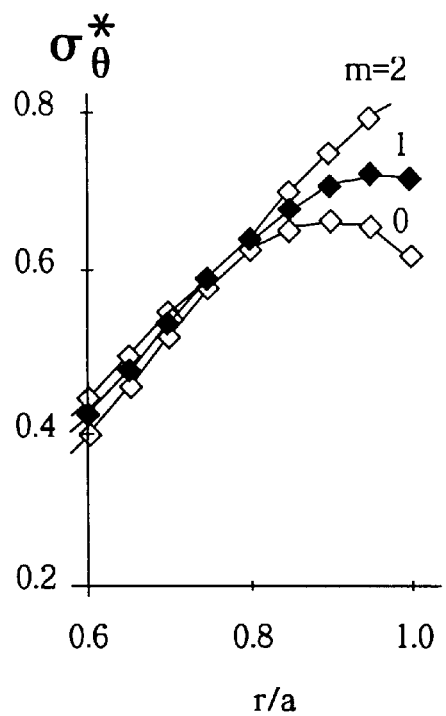
Figure 2C:
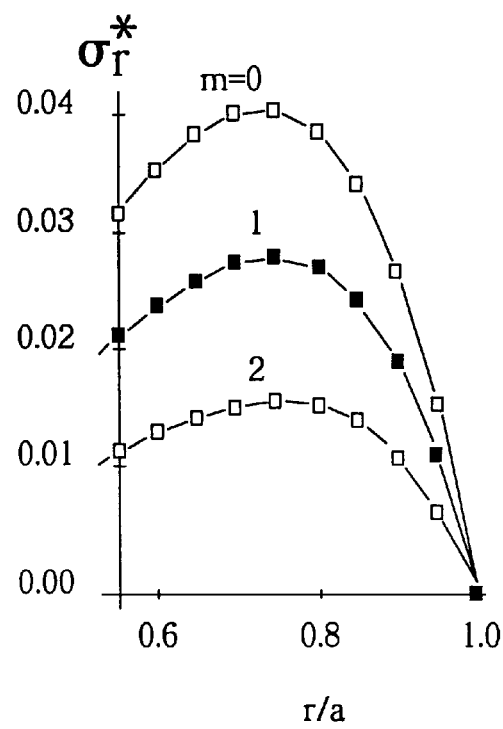

An all-hoop rotor can be designed to suppress premature failure modes. One approach is to reduce radial stress by varying the ply stiffness as a function of radius. The formulation was also provided by Lekhnitskii in the reference cited above. The hoop stiffness varies by a power law of the radius, the exponent being represented by m. The results are shown in FIGS. 2A, 2B, and 2C. In FIG. 2A, the stiffness $E_\theta$ is shown for three values of m; m=0 for isotropy; m=1 for linear; and m=2 for quadratic. The hoop stresses $\sigma_\theta$, as shown in FIG. 2B, are intermingled as the exponent m varies. The radial stresses $\sigma_r$, as shown in FIG. 2C, are highly dependent on the exponent m, the radial stress decreasing as m increases from 0 to 2. Thus, variation of hoop stiffness is another way of obtaining a reduction of radial stresses. The reduction of radial stresses is obtained by using stiffer fibers at the outer radius of the rotor, and by using fibers of lesser stiffness at the inner radius of the rotor.

Energy storage capacity is maximized for the same stiffness distribution as that which minimizes radial stress, that is to say energy storage capacity is a maximum when $E_\theta$ varies as $r^m$, where m=2. For m greater than 2, energy storage capacity is diminished for given material and inside and outside rotor radii.

Higher fiber volume fraction will bring higher stiffness and higher strength that will reduce radial stresses and improve energy storage capacity. Thiokol TRC can supply prepreg containing T1000™ fiber in percentages by volume of up to the high 70s percent. At 75 percent, the material will have a composite stiffness of 31 msi and strength of 670 ksi. Equivalent fiber volume can also be achieved through the wet winding method shown in FIG. 13B. This material can be used as the outer rim, or the outer ply, of the rotor. All other materials used in the plies lying between the outer ply and the inner diameter of the rotor will have lower fiber percentage volumes and lower stiffness/strength. This hybridization scheme not only improves energy storage but also reduces cost as less expensive materials will be used inboard of the outer rim. This arrangement of materials will also provide an opportunity to select weaker materials so that a controlled failure of the rotor can be achieved.

Figure 3:
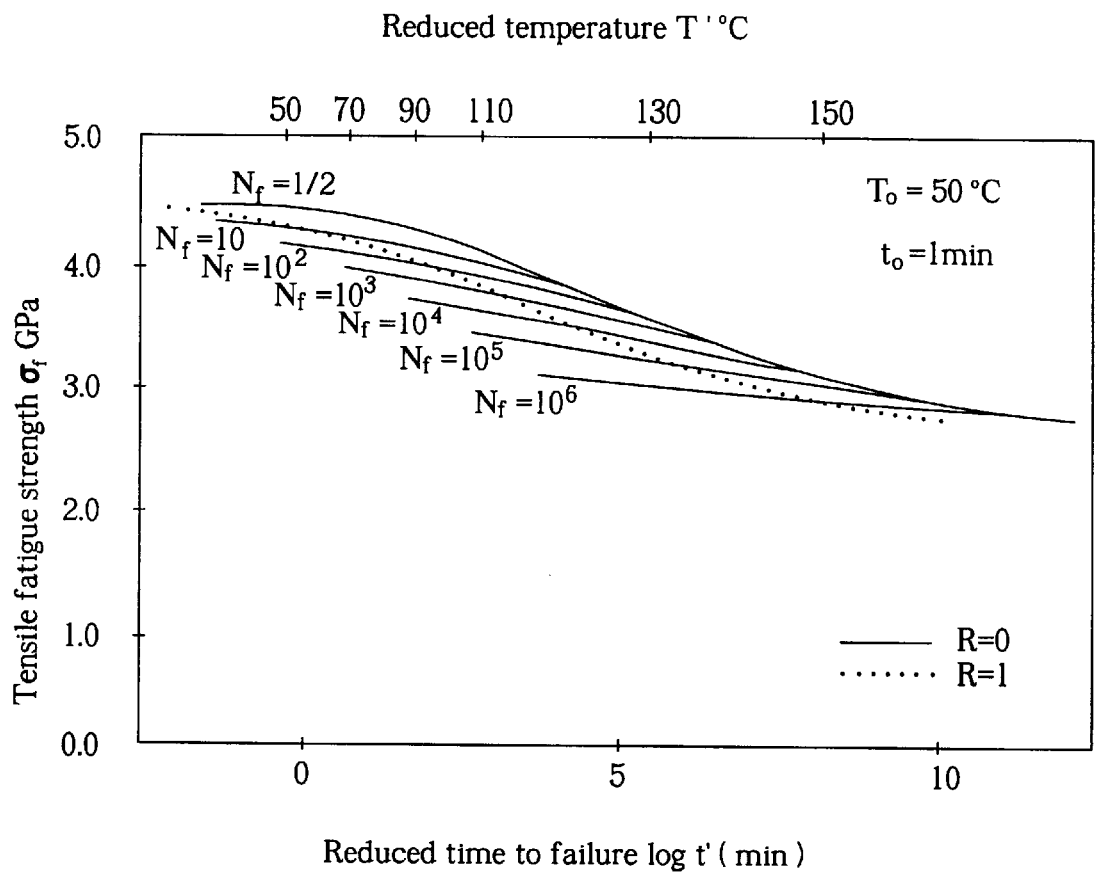
FIG. 3 shows the master curves of unidirectional carbon fiber reinforced plastic (CFRP) under strand test. This is a graph of tensile fatigue strength $\sigma_f$ in Gpa versus log of reduced time to failure.

Long-term durability of unidirectional fibers can be demonstrated by the data generated using the time-temperature superposition model. In FIG. 3, the master curves of a carbon unidirectional composite, as derived from strand tests, are shown. The parameter $N_f$ is the number of cycles. The term CFRP stands for carbon reinforced plastic. The curves are relatively flat. This means that this high carbon fiber (T400) composite is not sensitive to time, creep (R=1 shown in a dashed line) and fatigue loading (R=0). This is one of the best approaches to determine long-term durability for composite structures like rotors. Comparable master curve for the radial strength is also available for design of rotor material subjected to biaxial stress.

We have explored the effects of changing radial stiffness and density of plies along radial direction. The radial stiffness does not change much if the same resin system is used for different fibers. Thus its effect on energy storage is small.

Changes in density of the plies, however, do have a significant effect on energy storage. In fact, the optimum power exponent m is negative, opposite the hoop stiffness. Thus the preferred density variation is to increase as we go from the outer rim toward the center. This result is based on the need to minimize the radial stress. One possible option for achieving the needed result would be to add metallic or ceramic powder to the resin in the inboard portion of the rotor so that the inboard portion is less stiff (by having a smaller fiber fraction than the outer portion) but heavier material. An added advantage of this approach is that weakened plies (less fiber and more brittle matrix) need less containment.

The optimization of a flywheel rotor includes the application of one or another failure criterion to the stress analysis.

There are many failure criteria that can be applied to the results of stress analysis to determine the failure of plies. Among the most popular criteria, only Tsai-Wu's quadratic criterion provides for interaction between tensile hoop and radial stress components. Criteria like max stress, max strain and Hashin do not recognize any interaction between these two critical stress components that exist in the rotor.

Figure 4:
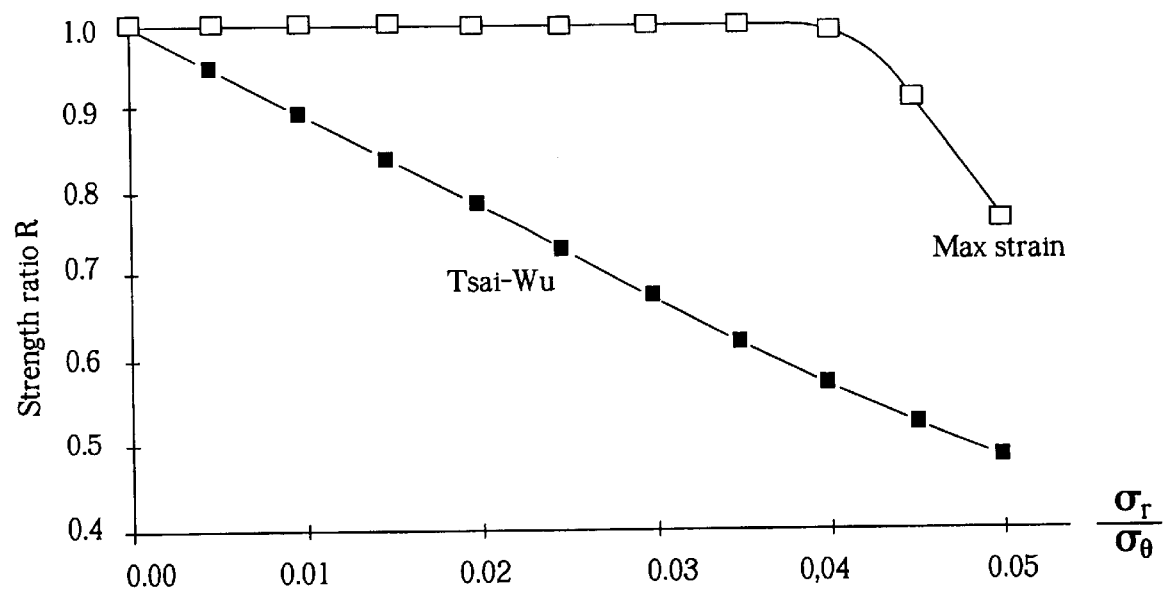
FIG. 4 shows the predicted strength of a unidirectional ply (or unidirectional layer) subjected to combined hoop and radial tensile stresses.

FIG. 4 shows the predicted strength of a unidirectional ply subjected to combined hoop and radial tensile stresses. The x-axis shows the ratio of radial to hoop stress from 0.0 (uniaxial tension) to 0.05 (5 percent hoop). The y-axis shows the strength ratio, a measure of effective strength. Two failure criteria are shown; i.e., maximum strain (a non-interactive criterion) and Tsai-Wu (an interactive criterion). The curves show that up to a radial stress of 4 percent, the max strain criterion shows no effect; while the Tsai-Wu shows a reduction in strength to 60 percent of the uniaxial strength.

It is therefore recommended that the Tsai-Wu interactive criterion be used for determining ply strength. This criterion is more realistic and conservative. With this criterion (using an interaction term of −1/2, as in "Theory of composites design" by Stephen W. Tsai, Think Composites, 1992), an optimization method can be applied that would select the degree of hybridization of the rotor that would maximize the total stored energy (TSE). Three materials are used in the present example. Their properties are listed in FIG. 5. These materials are Glass/epoxy (A); T300™/2500™ (B); and T800™/2500™ (C). T300™ and T800™ are proprietary fibers made by Toray.

Figure 6:
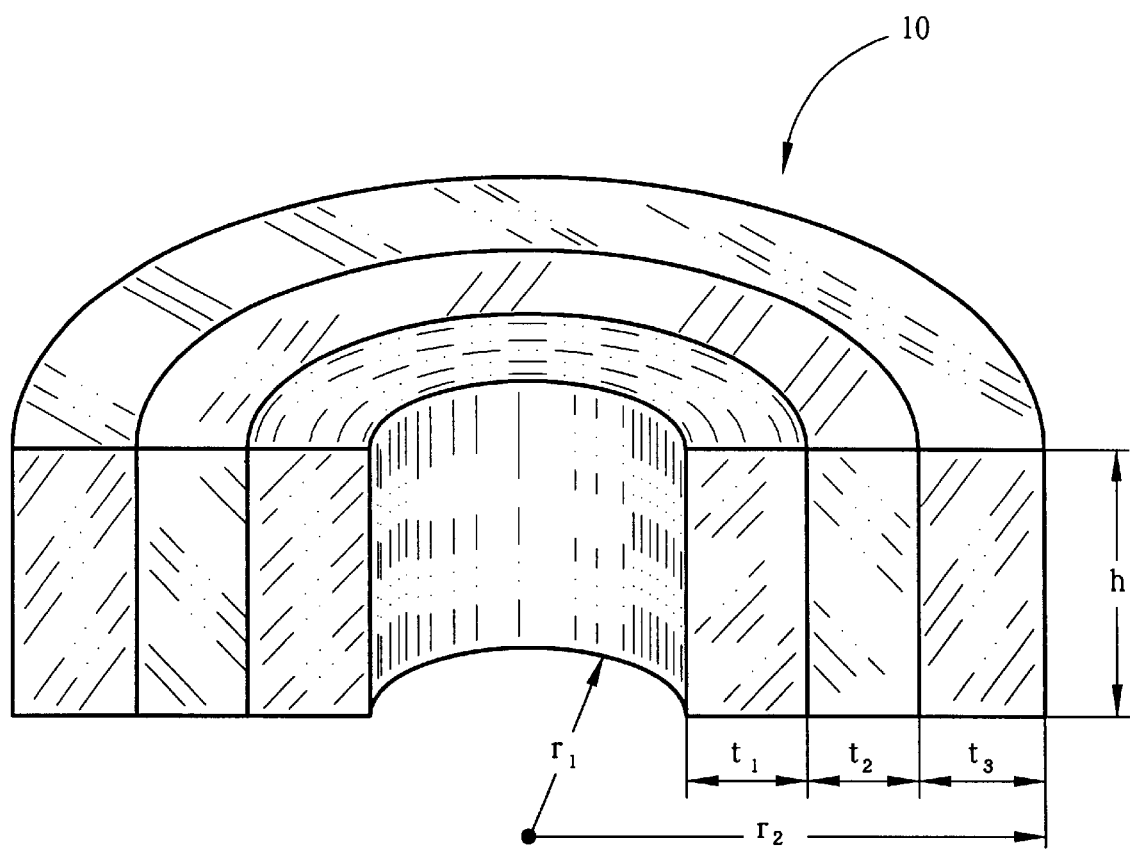
FIG. 6 is a cross-sectional view of a hybrid rotor.

FIG. 6 shows a cross-sectional view of a rotor with three plies or hoops of different materials. The rotor 10 has an inner radius $r_1$ and an outer radius $r_2$. The height of the rotor is h, which is the axial thickness of the rotor. The rotor contains three layers, in this example. These layers may also be referred to as hoops or plies. The inner layer has a radial thickness $t_1$. The second layer has a radial thickness $t_2$. The third layer or outer layer has a radial thickness $t_3$. Although FIG. 6 shows three layers, it should be understood that any number of layers is intended.

The optimization process for selecting the best rotor with the highest TSE while maintaining safety can be stated as follows:

Find $t_j(j=1,2,3 \ldots, N)$

Maximize TSE=$(1/2)I\omega^2$ (4)

Subject to Max R<1

Where R is the stress/strength ratio and failure occurs when R=1.

In equation (4), I is the mass moment of inertia of the hybrid rotor. The total stored energy (TSE) can be written in terms of the inner and outer radii of each ring:

$$TSE = \frac{\pi}{4}h\omega^2 \sum_{j=1}^{N}(r_{j+1}^4 - r_j^4)\rho_j \quad (5)$$

Figure 7:
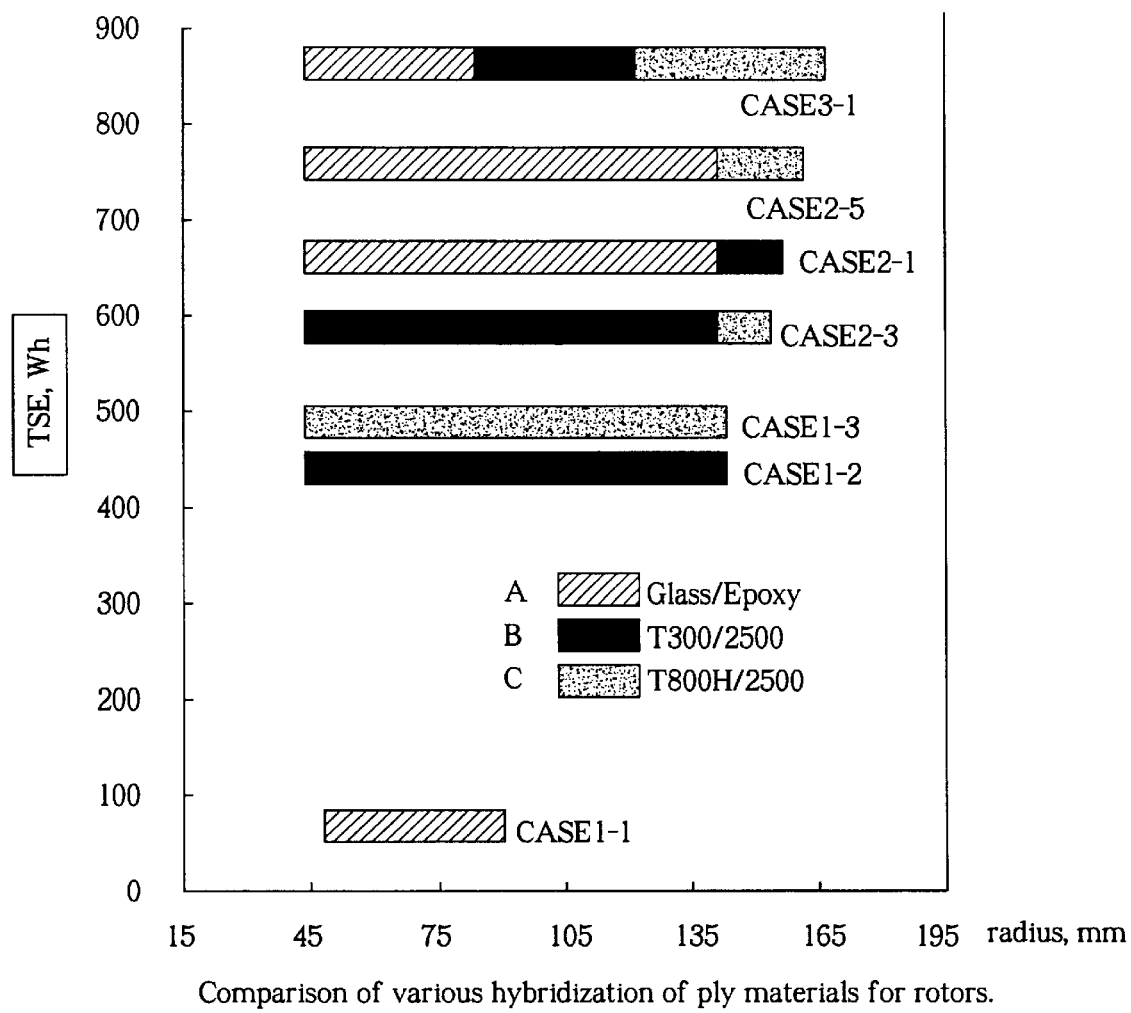
FIG. 7 shows the results of modeling the use of the materials of FIG. 5 in the rotor of FIG. 6.

To solve the nonlinear optimization problem stated in Equation 4, a modified method of feasible directions for constrained minimization is used. The results are shown in FIG. 7 for using the materials in FIG. 5, singly, in pairs, and in triplets. FIG. 7 shows the total stored energy TSE in units Wh on the vertical axis and the radial distribution of the various materials on the horizontal axis in millimeters. Optimizations were performed for up to three different composite layers. The thickness of each composite layer is considered as a design variable and divided into elemental layers. The rotating speed is 60,000 RPM. To avoid inaccuracy, a minimum value for layer thickness was set at 0.01 millimeter. It is clear from FIG. 7 that hybridization of materials with increasing stiffness would lead to the highest total stored energy TSE. This trend is consistent with the increasing hoop stiffness as shown in FIGS. 2A–2C.

The highest stored energy is achieved by having three layers of materials with increasing stiffness along the radial direction.

The number of layers need not be limited to one two or three. Four or more rings may be advantageous. In each ring, materials other than those listed in FIG. 5, may be used. In particular, T1000™ may be used. Other fiber composite materials may also be used.

To date, flywheels have been made by multiple-step winding and multiple cure cycles. This process is time consuming, costly and introduces interfaces that could trigger rotor failure.

Figure 8:
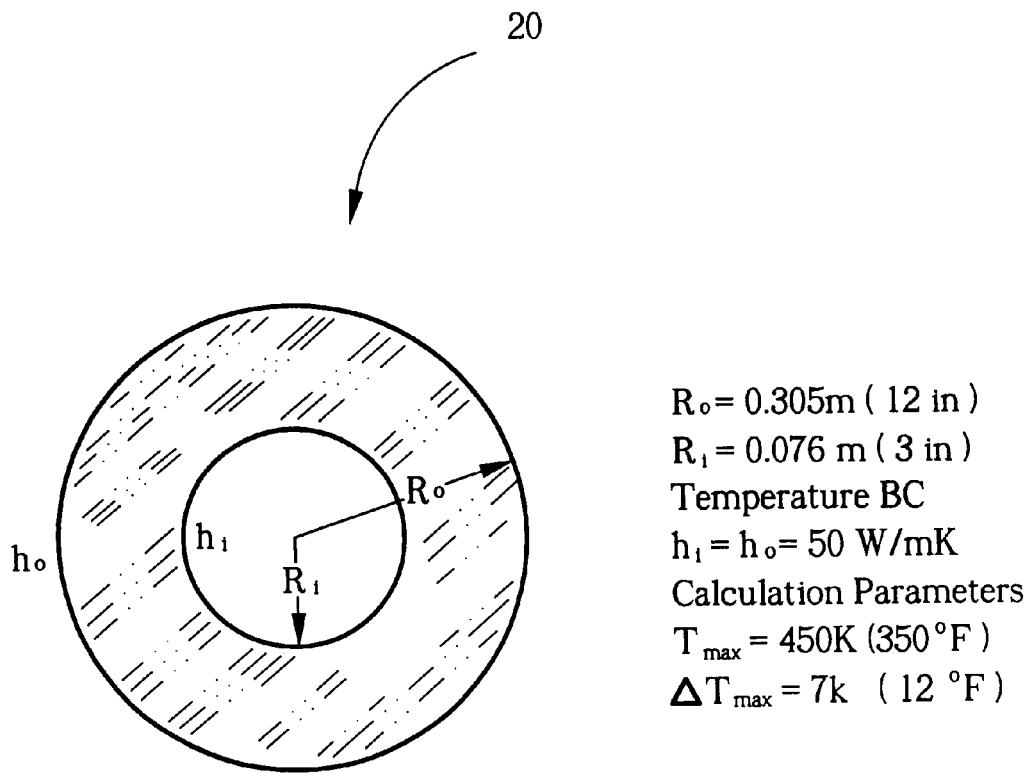
FIG. 8 shows the geometry and parameters of a rotor as used in modeling cure cycles.

The present invention provides a single step smart cure. FIG. 8 shows the geometry and BC parameters used in cure modeling. In FIG. 8, the rotor 20 has an inner radius Ri=0.076 m (3 in) and an outer radius Ro=0.305 m (12 in). The temperature BC heat fluxes are $h_i=h_o=50$ W/mK. The calculation parameters are Tmax=450 K and ΔTmax=7 K.

Figure 9A:
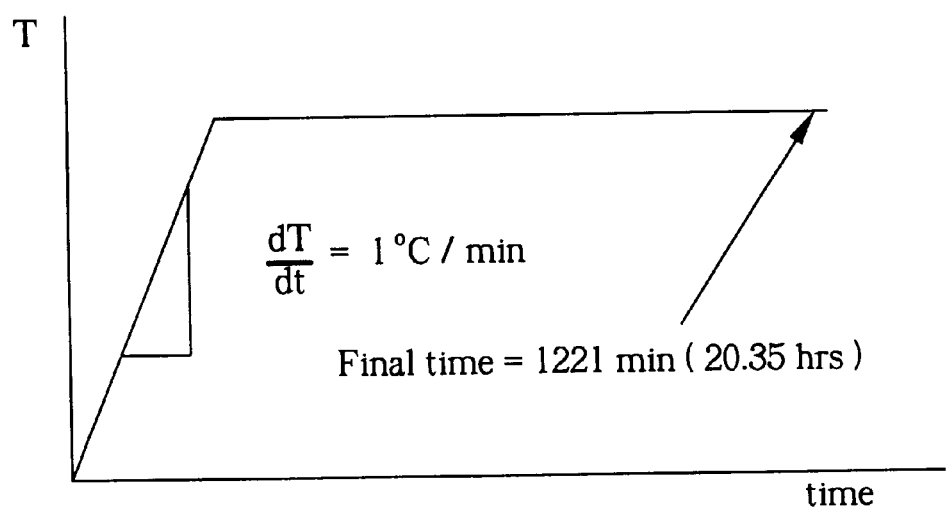
FIG. 9A is a graph of a cure cycle showing temperature versus time and particularly showing a linear temperature ramp-up.
Figure 9B:
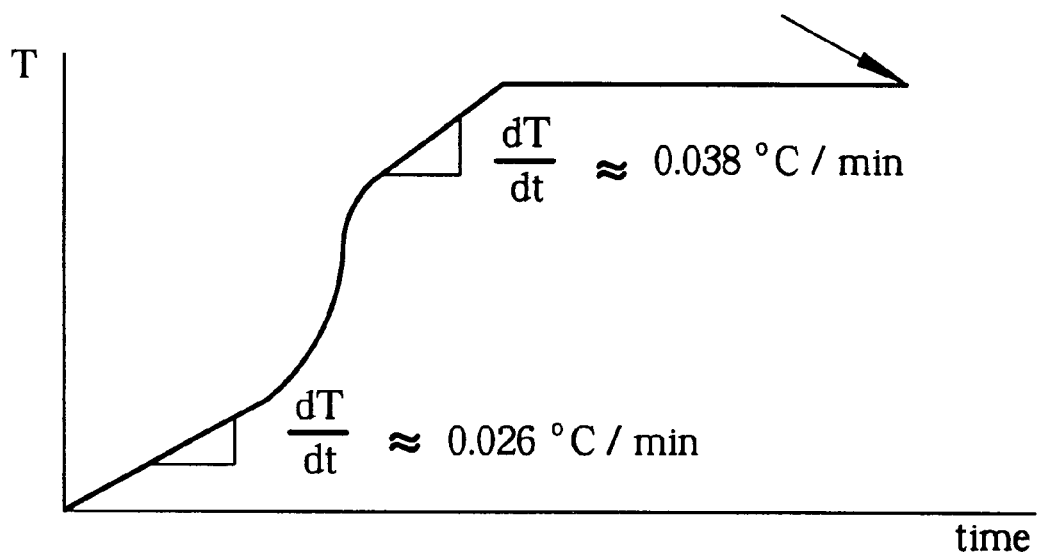
FIG. 9B. shows a smart cure cycle based on modeling the particular rotor structure shown in FIG. 8.

Two cure cycles are shown in FIGS. 9A and 9B. FIG. 9A shows an example of a conventional cure cycle, in which the temperature of the oven ambient is ramped at 1° C./min to a maximum temperature Tmax. FIG. 9B shows a smart cure cycle, in which the oven ambient temperature is not ramped at a constant rate, but rather is ramped at rates determined by the computer model taking account of factors including exothermic reactions in the rotor.

Figure 10A:
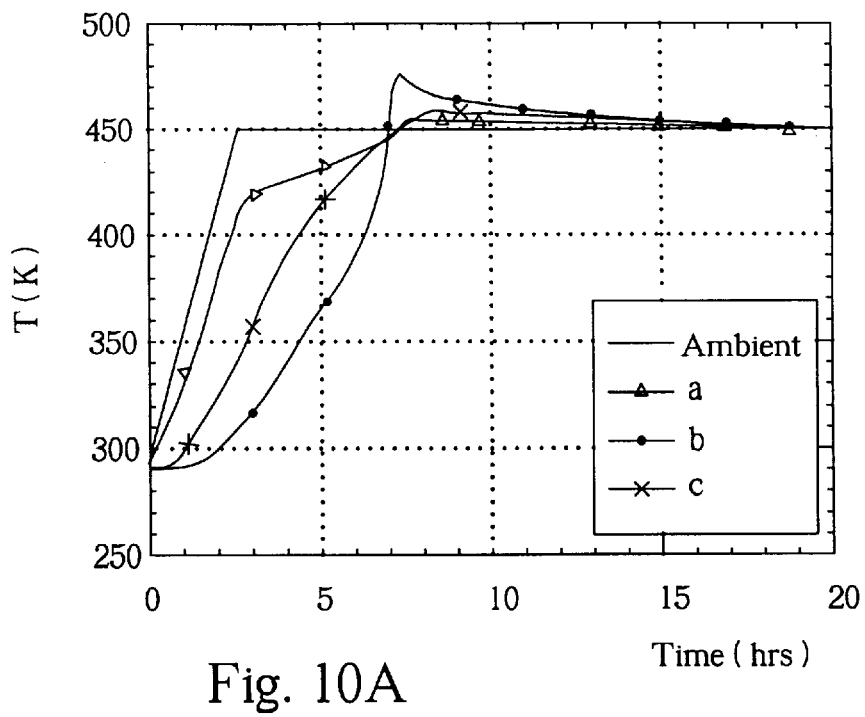
FIG. 10A shows modeling results for the conventional cure cycle of FIG. 9A.
Figure 10B:
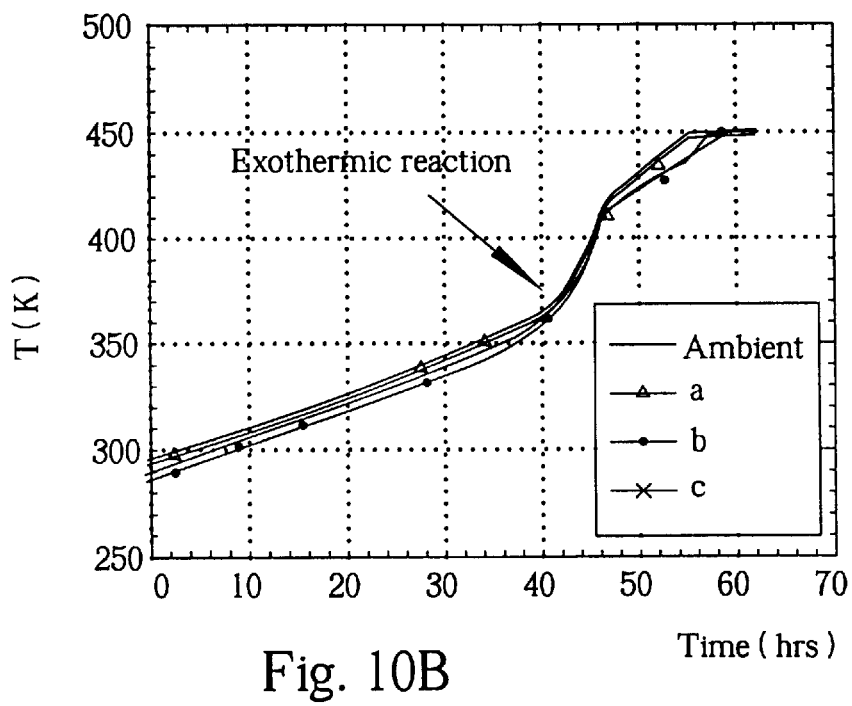
FIG. 10B shows modeling results for the smart cure cycle of FIG. 9B showing temperature versus time at the same three radiuses within the rotor of FIG. 8.

FIGS. 10A and 10B show temperature versus time profiles, as modeled, for the rotor of FIG. 8 when it is subjected to the cure cycles of FIGS. 9A and 9B, respectively. In both FIGS. 10A and 11B, temperature is shown for three radial locations within the rotor. These locations are at radiuses of 3, 7 and 10 inches, designated as a, b, and c, respectively. When the temperature throughout the rotor remains nearly uniform, as it does in FIG. 10B, then the residual stresses will be minimized. The time required, to complete the smart cure cycle, is three times as long as the conventional cure. Improved quality of the rotor can be expected from the smart cure. Multi-step curing, in which each ring is cured before the next ring is applied, would take even longer than the smart cure because time is required for each successive heating and cooling. Multi-step curing is, for this reason, not desirable. Multi-step curing is also not desirable because it can result in weak bonds between rings.

To prevent wrinkles, there are other options available in curing. For example one could control the curing from the internal diameter ID to the outer diameter OD. Another option would be to impose tensile hoop stress by centrifugal force during curing.

Centrifugal casting may be used for infusing resin into a rotor wound from dry fibers. Centrifugal force can also be applied during curing to ensure a positive hoop stress whereby ply wrinkling can be minimized or even eliminated. This addition of centrifugal pressure during a smart cure will undoubtedly improve the quality of the rotor.

Consider the theory involved in such a centrifugal smart cure. Consider a flywheel having an inner radius of 3 inches and an outer radius R. First, dry tows, parallel fiber strands without resin, are wound on a mandrel. The rotor is rotated at a constant angular velocity and resin is supplied from the center. The resin velocity in the rotating rotor can be assumed to be one-dimensional and can be described as $$u = -\frac{K}{\mu}\left[\frac{\partial p}{\partial r} - \rho r \omega^2\right] \quad (6)$$

Pressures at the inner and outer radii are atmospheric.

The pressure profile is obtained by integrating equation 6 and is given by $$p(r) = -\frac{\rho(r_i^2 - R^2)\omega^2}{2}\frac{\ln(r/R)}{\ln(r_i/R)} + \frac{\rho(r^2 - R^2)\omega^2}{2} \quad (7)$$

The resin cure reaction is here neglected. The time required to completely infiltrate the rotor is given by $$t_{fill} = \int_{r_i}^{R} \frac{\mu}{K} \frac{2R\ln(r_i/R)}{\rho(r_i^2 - R^2)\omega^2} dR \quad (8)$$

For a given average fiber volume fraction, the permeability will be assumed as uniform and is simply given by the Carman-Kozeny equation.

$$K = \frac{r_f^2}{4k_{rr}} \frac{(1-V_f)^3}{V_f^2} \quad (9)$$

Figure 12:
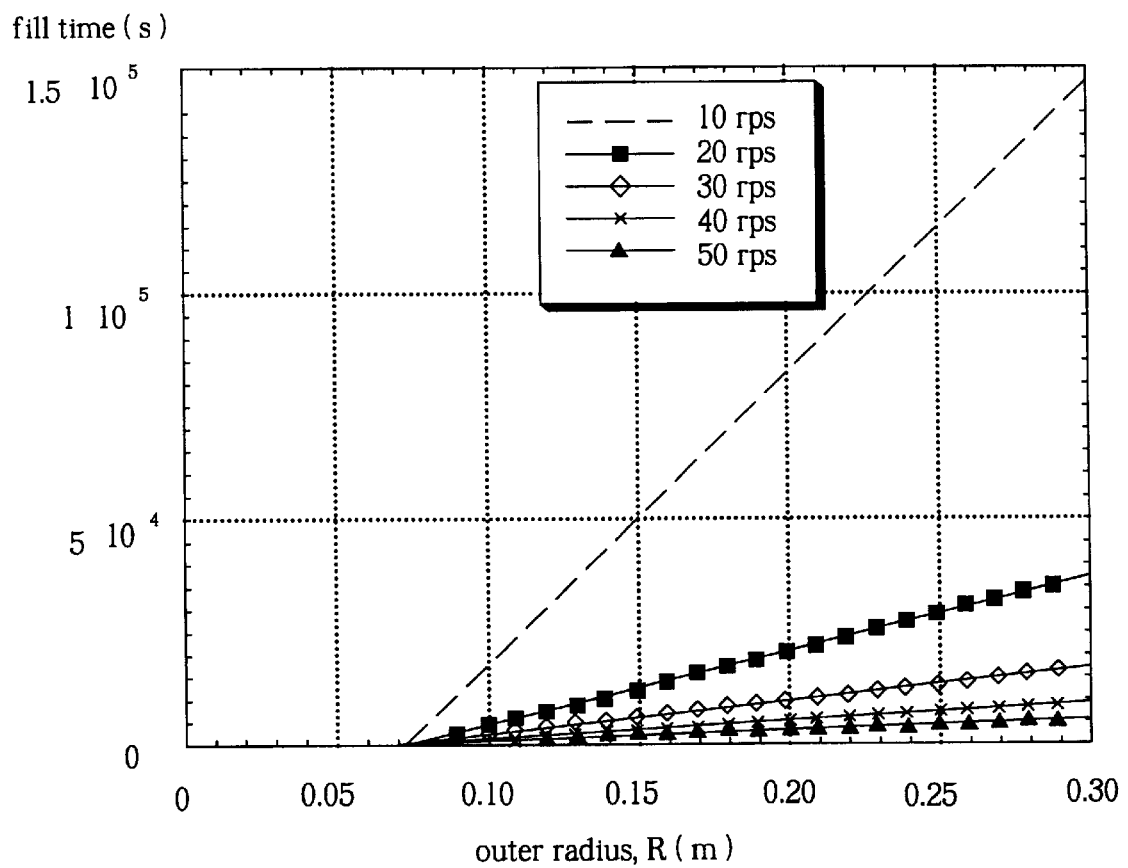
FIG. 12 shows fill time of centrifugal infusion as a function of radius at various rotational velocities in rps.

A sample calculation can be made with typical material properties listed in FIG. 11. FIG. 11 is a Table of material properties and processing conditions for fiber volume of 60 percent. The fill time for 0.3 m radius flywheel is about 10,000 seconds or 3 hours at a rotational speed of 50 rps or 3,000 RPM. This is shown in FIG. 12. These are order of magnitude estimates but clearly show that the centrifugal force is a doable concept.

The use of weakened materials in rotors will now be discussed.

An optimum rotor design would have the stiffest and strongest ply or ring on the outer rim. T1000™ is the best candidate in terms of strength of the rotor. All inner plies are made to conform to the radial deformation such that radial stress is minimized. The inner plies are growing compatibly with the outer ring so that there are no radial gaps. As the speed increases, more radial deformation will occur but radial stress remains very small.

For highly anisotropic materials, biaxial tension is very detrimental. This has been shown in FIG. 4. The strength ratio (or factor of safety) reduces rapidly as the radial stress increases relative to hoop stresses. Hoop stiffness of a highly anisotropic material will reduce radial stresses, as shown in FIG. 2. Thus, high anisotropy and high descent of stiffness (including a quadratic drop) will significantly reduce radial stress. As to stiffness drop, it may be interesting to explore how this can be achieved in practice. One way would be to reduce the fiber fraction for inboard plies. Both the ply stiffness and strength will drop linearly. The use of deliberately weakened material may allow control of the failure progression of a rotor.

One key to controlled failure is to make the outer rim of the rotor the failure initiation zone. Once the outer rim fails by overstress, the inboard material will be so weak that it will disintegrate completely by having resin stripped from fibers. This type of failure is normally observed from glass/epoxy composites that literally explode when the ultimate strength is reached. The resulting pieces of this failure mode are small and can be easily contained. It is along this line that the containment required for the rotor can be reduced in strength and mass. Instead of having a containment cylinder that weighs as much as the rotor, a controlled failure design may significantly reduce the need for a heavy containment system.

Different manufacturing processes for flywheel rotors will now be discussed.

Figure 13:
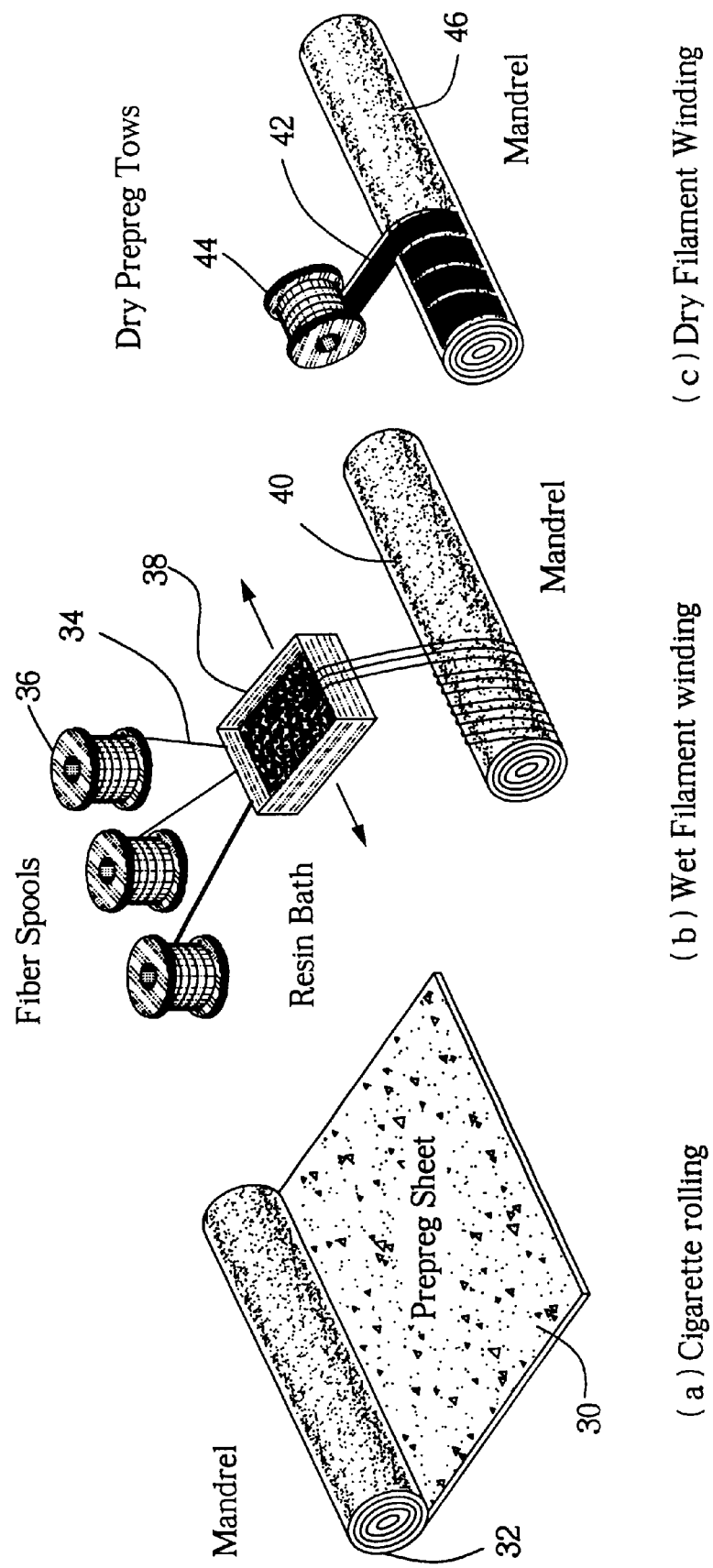
FIG. 13 illustrates three methods of applying fiber composites to a mandrel, methods that are applicable to the manufacture of the hybrid rotor of the present invention.

FIG. 13, part (a) illustrates a manufacturing process known as "cigarette rolling". In FIG. 13 part (a), a prepreg sheet 30 is rolled onto a mandrel 32.

FIG. 13, part (b) illustrates a manufacturing process, known as "Wet filament winding". In FIG. 13 part (b) Filaments 34 from spools 36 pass through a resin bath 38 and are then wound onto a rotating mandrel 40. A variation of this wet process is to use preimpregnated tapes.

FIG. 13 part (c) shows a manufacturing process known as "Dry filament winding". In FIG. 13 part (c), dry prepreg tows 42 are wound from a spool 44 and wound onto a mandrel 46.

Any of the manufacturing processes shown in FIG. 13, parts (a), (b), or (c) can be used in the manufacture of flywheel rotors in accordance with the present invention. The optimum process will be one that gives the required total energy storage, with the required reliability and extended life, at a reasonable cost.

Figure 14:
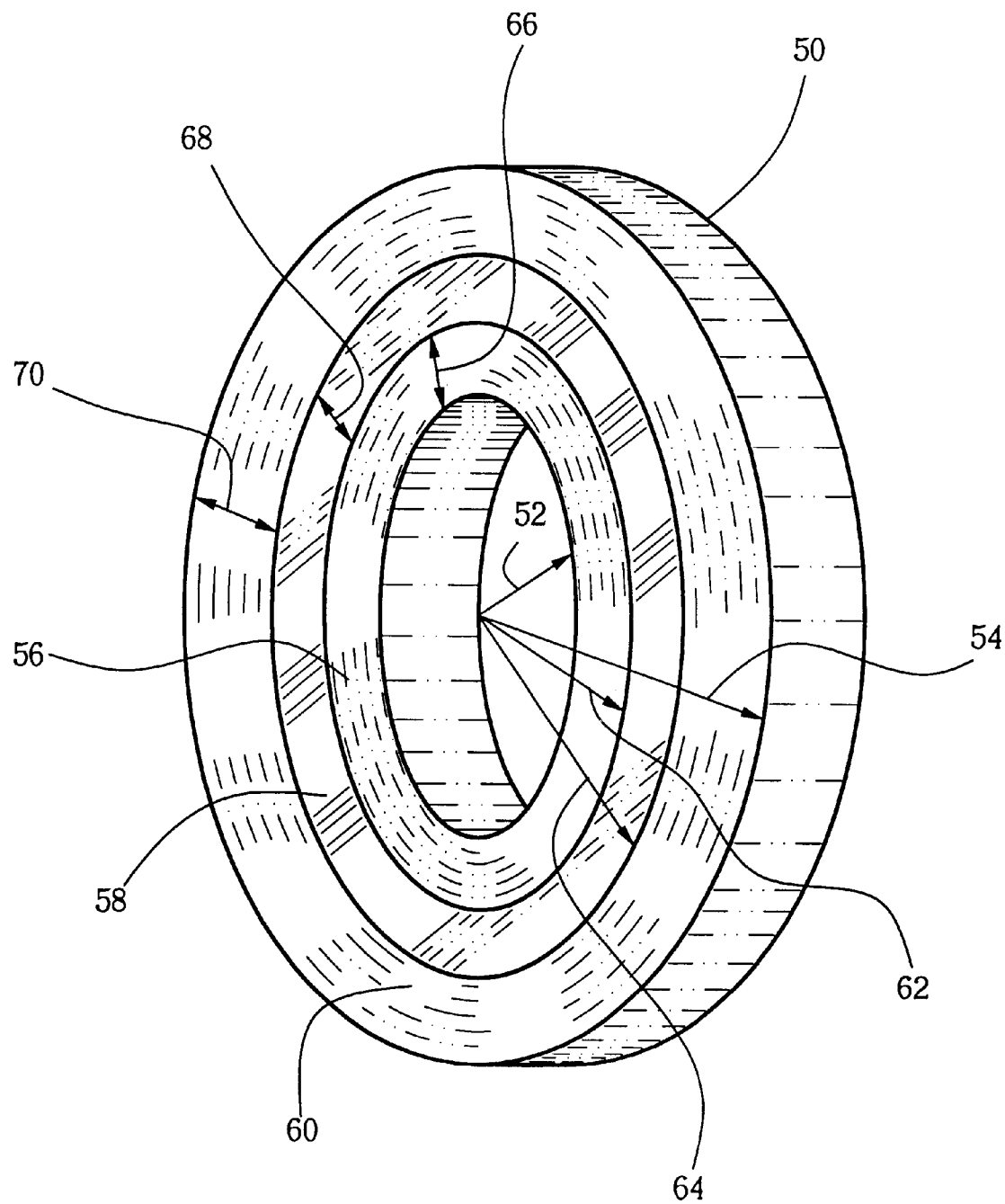
FIG. 14 is a perspective view of a hybrid rotor in accordance with the present invention.

FIG. 14 shows a flywheel comprising a hybrid rotor in accordance with the present invention. The hybrid rotor 50 is an annular cylinder in shape, having inner radius 52 and an outer radius 54. The region between the inner radius 52 and the outer radius 54 is comprised of concentric layers. Three concentric layers 56, 58, and 60 are shown. Layer 56 is joined to layer 58 at the radius 62. Layer 58 is attached to layer 60 at the boundary defined by radius 64. The radial thickness 66 of layer 56 is the length of radius 62 minus the length of radius 52. The radial thickness 68 of layer 58 is the difference between the length of radius 64 and the length of radius 62. The thickness 70 of layer 60 is equal to the length of radius 54 minus the length of radius 64. Layer 60 is the outer layer. Each of the layers 56, 58, and 60 is made of material containing a fiber composite material. The physical characteristics of the material in each layer are chosen to maximize the total stored energy of rotation and to minimize the rotational radial stress. In particular the stiffness of each material is chosen so that stiffness increases going from the inner radius 52 to the outer radius 54. Therefore the outer layer 60 is the stiffest layer and the inner layer 56 is the least stiff layer. Computer modeling shows that radial stress is a minimum and total stored energy ids a maximum when the stiffness of the layers varies as the square of the radius. Therefore the hybrid rotor shown in FIG. 14 preferably approximates such a quadratic stiffness distribution, while allowing for the fact that there is in the distribution for each layer.

Exemplary embodiments of the present invention have been described. These are intended to be illustrative and not restrictive. Thus, the present invention is capable of many variations in detailed implementation, which may be derived from the description contained herein by a person of ordinary skill in the art. All such variations are considered to be within the scope of the appended claims.

What is claimed is:

1. A flywheel comprising a hybrid rotor, the hybrid rotor having an inner rotor radius and an outer rotor radius, the hybrid rotor comprising:

a number of hoop stress opposing concentric hoops, each hoop comprising a layer of fiber composite material, each hoop having a radial thickness, an inner hoop radius and an outer hoop radius, the hoops being in immediate adjacent and adhesive concentric contact, the outer hoop having an outer hoop radius equal to the rotor outer radius, the inner hoop having an inner hoop radius equal to the inner rotor radius, wherein the stiffness of the fiber composite material in the outer hoop is at a maximum and wherein the fiber composite stiffness decreases in accordance with Tsai-Wu's quadratic criterion from hoop to hoop going from the outer hoop to the inner hoop.

2. The flywheel of claim 1 wherein the hybrid rotor comprises three of said hoops, wherein the fiber composite material in the outer hoop comprises a modulus of elasticity in hoop direction of about 155 GPA, wherein the fiber composite material in a middle hoop comprises a modulus of elasticity in hoop direction of about 130 GPA and wherein the fiber composite material in the inner hoop comprises a modulus of elasticity in hoop direction of about 38.6 GPA.

3. The flywheel of claim 2 wherein the inner hoop comprises glass/epoxy composite material.

4. The flywheel of claim 2 wherein at least one of the outer hoop and the middle hoop comprises carbon/epoxy composite material.

5. The flywheel of claim 1 wherein the mass density of the fiber composite material in the inner hoop is greater than the mass density of the fiber composite material in the outer hoop.

6. The flywheel of claim 1 wherein at least one of the hoops further comprises metallic powder.

7. The flywheel of claim 1 wherein at least one of the hoops further comprises ceramic powder.

8. The flywheel of claim 1, wherein a square root of a ratio of the hoops' hoop modulus of elasticity over the hoots' radial modulus of elasticity is larger than 2.

9. The flywheel of claim 8, wherein the square root of the ratio is about 5.9.

10. The flywheel of claim 1, wherein the outer hoop is a failure initiation hoop initially disintegrating in case of overload of the hybrid rotor and wherein hoops inside the outer hoop are configured such that they instantaneously and completely disintegrate following the initial failure of the outer hoop.

11. The flywheel of claim 10, further comprising a containment system having a mass significantly less than a mass of the flywheel.

* * * * *